(12) United States Patent
Odendall

(10) Patent No.: US 11,598,281 B2
(45) Date of Patent: *Mar. 7, 2023

(54) METHOD FOR OPERATING A DRIVE DEVICE AND CORRESPONDING DRIVE DEVICE

(71) Applicant: AUDI AG, Ingolstadt (DE)

(72) Inventor: Bodo Odendall, Lenting (DE)

(73) Assignee: AUDI AG, Ingolstadt (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/563,420

(22) Filed: Dec. 28, 2021

(65) Prior Publication Data

US 2022/0243680 A1 Aug. 4, 2022

(30) Foreign Application Priority Data

Feb. 3, 2021 (DE) .......................... 102021102455.2

(51) Int. Cl.
*F02D 41/14* (2006.01)
*F02D 41/24* (2006.01)

(52) U.S. Cl.
CPC ..... *F02D 41/2432* (2013.01); *F02D 41/1441* (2013.01); *F02D 41/1454* (2013.01)

(58) Field of Classification Search
CPC ............. F02D 41/2432; F02D 41/1441; F02D 41/1454

See application file for complete search history.

(56) References Cited

U.S. PATENT DOCUMENTS

| 5,056,308 A | 10/1991 | Kume et al. |
| 6,026,795 A | 2/2000 | Poggio et al. |
| 6,233,922 B1 | 5/2001 | Maloney |

(Continued)

FOREIGN PATENT DOCUMENTS

| DE | 19851843 A1 | 5/2000 |
| DE | 102006021455 A1 | 12/2007 |

(Continued)

OTHER PUBLICATIONS

German Examination Report dated Sep. 30, 2021 in corresponding German Application No. 102021102455.2 12 pages; Machine translation attached.

*Primary Examiner* — Phutthiwat Wongwian
*Assistant Examiner* — Arnold Castro
(74) *Attorney, Agent, or Firm* — Maier & Maier, PLLC

(57) ABSTRACT

A method for operating a drive device having a drive unit producing exhaust gas and an exhaust gas posttreatment device designed as a vehicle catalytic converter for posttreatment of the exhaust gas. A first measured value describing the residual oxygen content in the exhaust gas is measured by a first lambda sensor arranged upstream of the exhaust gas posttreatment device and a second measured value describing the residual oxygen content in the exhaust gas is measured by a second lambda sensor arranged downstream of the exhaust gas posttreatment device. The combustion air ratio of a fuel-air mixture used to operate the drive unit is set during an at least temporarily performed normal operating mode on the basis of the first measured value, the second measured value, and a threshold value for the second measured value.

20 Claims, 2 Drawing Sheets

(56) References Cited

U.S. PATENT DOCUMENTS

| | | | | |
|---|---|---|---|---|
| 6,567,738 | B2* | 5/2003 | Gopp | F02D 41/1441 |
| | | | | 60/276 |
| 7,270,119 | B2* | 9/2007 | Mitsutani | F02D 41/1482 |
| | | | | 123/674 |
| 8,165,787 | B2* | 4/2012 | Reed | F02D 41/1441 |
| | | | | 60/285 |
| 9,291,085 | B2* | 3/2016 | Yanase | F02D 41/1474 |
| 9,650,981 | B1* | 5/2017 | Large | F02D 41/1441 |
| 9,745,910 | B2* | 8/2017 | Nakamura | F02D 41/1439 |
| 10,302,002 | B2* | 5/2019 | Hagiwara | F01N 11/00 |
| 2003/0106303 | A1* | 6/2003 | Plote | F01N 3/023 |
| | | | | 60/276 |
| 2010/0146936 | A1* | 6/2010 | Sawada | F02D 41/1454 |
| | | | | 60/277 |
| 2022/0243635 | A1* | 8/2022 | Odendall | F02D 41/1456 |

FOREIGN PATENT DOCUMENTS

| | | |
|---|---|---|
| DE | 102010002586 A1 | 9/2011 |
| DE | 102013201734 A1 | 8/2014 |

* cited by examiner

METHOD FOR OPERATING A DRIVE DEVICE AND CORRESPONDING DRIVE DEVICE

FIELD

The invention relates to a method for operating a drive device having a drive unit producing exhaust gas and an exhaust gas posttreatment device designed as a vehicle catalytic converter for posttreatment of the exhaust gas, wherein a first measured value describing a residual oxygen content in the exhaust gas is measured by means of a first lambda sensor arranged upstream of the exhaust gas posttreatment device and a second measured value describing the residual oxygen content in the exhaust gas is measured by means of a second lambda sensor arranged downstream of the exhaust gas posttreatment device, and wherein the combustion air ratio of a fuel-air mixture used to operate the drive unit is set during an at least temporarily performed normal operating mode on the basis of the first measured value, the second measured value, and a threshold value for the second measured value. The invention furthermore relates to a drive device.

BACKGROUND

For example, the document DE 42 11 116 A1 is known from the prior art. This describes a method and a device for onboard diagnosis of catalytic converters. For this purpose, the lambda value of the mixture is deliberately modulated so that the periodically successive amounts of excess of oxygen and deficiency of oxygen successively increase. The time at which the compensating effect linked to the oxygen storage capacity of the catalytic converter on the oxygen concentration variations in the exhaust gas is no longer sufficient for compensation of the mentioned increased amounts is detected by the jump reaction of a lambda probe arranged downstream of the catalytic converter. The time span between this time and the start of the increase is used as a measure of the conversion capacity of the catalytic converter.

It is the object of the invention to propose a method for operating a drive device which has advantages over known methods, in particular enables a lower fuel consumption of the drive device by precisely setting the combustion air ratio.

SUMMARY

This is achieved according to the invention by a method for operating a drive device. It is provided here that the threshold value is ascertained in that during an at least temporarily performed calibration operating mode, the combustion air ratio is changed around a variable mean value over time periodically at a determined amplitude and a determined frequency and the target value is ascertained from the second measured value when a variation of the second measured value over time caused by the change of the combustion air ratio falls below a variation threshold value.

The drive device is used in particular to drive a motor vehicle and thus to provide a drive torque directed to driving the motor vehicle. The drive device is preferably part of the motor vehicle, but can also be provided separately therefrom, of course, and is used in this case solely to provide the drive torque.

The drive torque is provided by the drive device with the aid of the drive unit. This is operated using the fuel-air mixture, which is supplied to the drive unit or is first produced in the drive unit. In each case, fresh gas and fuel are supplied to the drive unit, wherein the fresh gas at least sometimes and at least partially contains fresh air from an external environment of the drive device. The drive unit is provided in particular as an internal combustion engine, particularly preferably as a diesel internal combustion engine or as a gasoline internal combustion engine.

During the operation of the drive unit, exhaust gas arises which is supplied to the exhaust gas posttreatment device and is discharged via this in the direction of the external environment. The exhaust gas posttreatment device is designed here as a vehicle catalytic converter, is thus used for a catalytic conversion of pollutants contained in the exhaust gas into less hazardous products. The vehicle catalytic converter is provided in particular as a three-way catalytic converter or as a storage catalytic converter. The exhaust gas produced in the drive unit can optionally be at least partially returned into the drive unit, so that the fresh gas supplied to the drive unit is at least partially provided as exhaust gas. Such a procedure is referred to as exhaust gas recirculation.

The fuel-air mixture used to operate the drive unit has the combustion air ratio. The combustion air ratio describes the mass ratio of air to fuel relative to the stoichiometrically ideal ratio here. At a combustion air ratio of one, the fuel-air mixture is thus stoichiometric, at a combustion air ratio of less than one, there is a deficiency of air, and at a fuel air ratio greater than one, there is an excess of air.

The combustion air ratio is set at least during the normal operating mode on the basis of two measured values, namely on the basis of the first measured value and the second measured value. The measured values are ascertained with the aid of lambda sensors. More precisely, the first measured value is measured with the aid of the first lambda sensor, which is arranged upstream of the exhaust gas posttreatment device, insofar thus fluidically between the drive unit and the exhaust gas posttreatment device. In contrast, the second measured value is measured with the aid of the second lambda sensor, which is arranged downstream of the exhaust gas posttreatment device, thus fluidically after the exhaust gas posttreatment device.

The first measured value describes the residual oxygen content of the exhaust gas upstream of the exhaust gas posttreatment device and the second measured value describes the residual oxygen content of the exhaust gas downstream of the exhaust gas posttreatment device. The first measured value is preferably provided in the form of a lambda value, thus as the combustion air ratio. The second measured value is preferably an electrical voltage supplied by the second lambda sensor.

It is preferably provided that a broadband lambda sensor is used as the first lambda sensor and a binary lambda sensor is used as the second lambda sensor. The broadband lambda sensor is preferably composed of multiple measuring cells, namely a pump cell and a Nernst cell. By way of such a construction, an accurate measurement of the residual oxygen content of the exhaust gas is also possible beyond a stoichiometric combustion air ratio by means of the broadband lambda sensor. In contrast, the binary lambda sensor preferably only has a single Nernst cell. It can thus also be referred to as a Nernst sensor or binary voltage sensor. The broadband lambda sensor has the advantage of a large measuring range, the binary lambda sensor has the advantage of a higher accuracy. Accordingly, a high accuracy of the lambda regulation and thus a high efficiency can be achieved by a combination of broadband lambda sensor and binary lambda sensor.

The first measured value is preferably regulated to a target value by setting the combustion air ratio. This process is also referred to as lambda regulation. The target value is preferably established here at least on the basis of the second measured value. To achieve particularly efficient operation of the drive unit, as soon as the second measured value reaches the threshold value, the combustion air ratio is adjusted within the first time span by the differential value in a determined direction. Subsequently, the combustion air ratio is adjusted in the same direction at a determined speed over the second time span. The threshold value can moreover also be referred to as a lambda threshold value or regulating threshold value.

It is thus preferably provided that the combustion air ratio is set in different ways during the two time spans. The second time span preferably immediately follows the first time span here. During the first time span, the combustion air ratio is changed by the differential value. The first time span has a certain duration, this is particularly preferably significantly less than a duration of the second time span. In particular, the adjustment of the combustion air ratio by the differential value takes place instantaneously or essentially instantaneously, so that the first time span is very short, in particular infinitesimally short.

In contrast, the adjustment of the combustion air ratio within the second time span takes place over a longer time period. It is not provided here that the combustion air ratio is immediately changed by a certain value, but rather the adjustment of the combustion air ratio takes place at the speed. The speed is to be understood in particular as a gradient of the combustion air ratio over time. For example, both the differential value and also the speed are permanently stored values.

The adjustment of the combustion air ratio is carried out in particular by adjusting the above-mentioned target value. It is thus provided within the normal operating mode that when the second measured value reaches the threshold value, the target value is adjusted within the first time span by the differential value in the determined direction and subsequently adjusted in the same direction over the second time span at the speed. Subsequently, in the scope of the explained lambda regulation, the first measured value is regulated to the target value, namely by setting the combustion air ratio.

In principle, the direction in which the combustion air ratio is adjusted is dependent on the direction in which the second measured value reaches the threshold value. If the second measured value reaches the threshold value in a first direction, for example from below, the combustion air ratio is thus adjusted in a first determined direction. In contrast, if the second measured value reaches the threshold value from a second direction different from the first direction, for example from above, the combustion air ratio is thus adjusted in a second determined direction opposite to the first determined direction. A so-called natural frequency regulation of the combustion air ratio is implemented in this way.

According to the above statements, the threshold value for the second measured value is necessary to operate the drive device. In the scope of the normal operating mode, the combustion air ratio is thus set on the basis of the first measured value, the second measured value, and the threshold value. More precisely, the target value is ascertained in the scope of a trim regulation on the basis of the second measured value and the threshold value. Subsequently, in the scope of the lambda regulation, the combustion air ratio or the first measured value is regulated to this target value. In addition, a specified value, which is defined, for example, on the basis of a driver specification of a driver of the motor vehicle, can be taken into consideration in the ascertainment of the target value.

The combustion air ratio is to be set in such a way that the highest possible conversion performance is achieved with the aid of the vehicle catalytic converter. This is provided in particular if an oxygen accumulator of the vehicle catalytic converter has a fill level between 30% and 50%, which is present in the case of a slightly rich fuel-air mixture. For this purpose, it is necessary to select the threshold value for the second measured value accordingly. The threshold value is moreover to enable stable operation. For this reason, the calibration operating mode is performed at least temporarily. This means that a change is made from the normal operating mode into the calibration operating mode.

In the calibration operating mode, the combustion air ratio is changed periodically over time at the determined amplitude and the determined frequency around the variable mean value. During this, the variation of the second measured value over time is detected and evaluated. If the variation of the second measured value over time falls below the variation threshold value, the threshold value is thus ascertained from the second measured value.

More precisely, the threshold value is ascertained from the second measured value, for which the variation is less than the threshold value.

In other words, the threshold value is ascertained from the second measured value, which occurs for that combustion air ratio at which the variation of the second measured value is less than the variation threshold value. The threshold value is particularly preferably ascertained from that second measured value for which the smallest variation occurs over the entire periodic change of the combustion air ratio. After the ascertainment of the threshold value, the calibration operating mode is ended and a change is made back into the normal operating mode.

Using the described procedure, the threshold value is selected in such a way that particularly stable operation can take place during the normal operating mode, thus without significant variations occurring due to the setting of the combustion air ratio on the basis of the second measured value and the threshold value. Moreover, a combustion air ratio which is slightly in the rich range, thus is slightly less than one, results from the threshold value selected in this way. For example, the threshold value corresponds to a combustion air ratio of at least 0.99 and is less than 1. It particularly preferably corresponds to a combustion air ratio of at least 0.995, at least 0.996, at least 0.997, or at least 0.998 and/or is at most 0.9995, at most 0.99925, or at most 0.999.

One refinement of the invention provides that the variation over time is ascertained by means of high-pass filtering from the second measured value. With the aid of the high-pass filtering, the second measured value is filtered around a mean value, so that ultimately the variation remains. For example, it is provided that first the combustion air ratio is periodically changed over time around the variable mean value, wherein the mean value is changed starting from a first value up to a second value. At the same time, the second measured value is detected and temporarily stored.

Only then is the second measured value evaluated and its variation occurring during the change of the mean value is determined. Subsequently, the second measured value is selected, for which the variation falls below the variation threshold value, in particular for which the variation is minimal. The threshold value is calculated from this measured value, in particular the threshold value is set equal to the second measured value for which the mentioned condition applies. The described procedure enables particularly accurate definition of the threshold value to implement the described advantages.

One refinement of the invention provides that the high-pass filtering is carried out using a limiting frequency, which is ascertained from the determined frequency. Frequencies which are less than the limiting frequency are filtered out of the second measured value with the aid of the high-pass filtering. Due to the high-pass filtering, thus only the variation of the second measured value thus remains, which results from the change of the combustion air ratio at the determined amplitude and the determined frequency around the variable mean value. To be able to ascertain the threshold value reliably, it is thus necessary to select the limiting frequency in such a way that the change of the combustion air ratio has an effect on the second measured value. For this purpose, the limiting frequency is ascertained from the determined frequency. In particular, the limiting frequency is selected to be less than or equal to the determined frequency. This enables a reliable determination of the threshold value.

One refinement of the invention provides that the combustion air ratio is changed around the variable mean value during a determined calibration time span, wherein the calibration time span is subsequently divided into multiple evaluation time periods and the respective variation of the second measured value is ascertained for each of the evaluation time periods. The change of the combustion air ratio takes place in the scope of the determined calibration time span. The variable mean value preferably has the first value at the beginning of the calibration time span and has the second value at the end of the determined calibration time span. In particular, the mean value is changed continuously and steadily during the calibration time span. Preferably, a determined gradient is applied to the mean value over the entire calibration time span, so that the mean value is changed consistently and uniformly.

For example, the first value corresponds to a combustion air ratio of one or of less than one, whereas the second value corresponds to a combustion air ratio of greater than one. During the calibration time span, the second measured value is detected and subsequently evaluated. This is carried out in a time-discrete manner in that the calibration time span is divided into the multiple evaluation time periods. For each of the evaluation time periods, the respective variation of the second measured value is subsequently ascertained, thus in each case a value of the variation of the second measured value. This enables efficient ascertainment of the threshold value which saves computing time.

One refinement of the invention provides that the variation is ascertained from a difference between a maximum value of the second measured value within the respective one of the evaluation time periods and a minimum value of the second measured value within the respective one of the evaluation time periods. Within each of the evaluation time periods, thus the respective maximum value and the respective minimum value of the second measured value are first ascertained. The maximum value is the largest value of the second measured value over the respective evaluation time period, and the minimum value is the smallest value of the second measured value over the respective evaluation time period. The variation for the respective evaluation time period is set equal to the difference between the maximum value and the minimum value. This is again used for the efficient ascertainment of the threshold value which saves computing time.

One refinement of the invention provides that from the evaluation time periods, that evaluation time period is selected for which the smallest variation is ascertained. After the ascertainment of the variations for the evaluation time periods, the ascertained variations are compared to one another. That evaluation time period is selected from these evaluation time periods for which the second measured value has the smallest variation. The threshold value for the second measured value can thus be ascertained rapidly and efficiently.

One refinement of the invention provides that the threshold value is ascertained from the second measured value in the selected evaluation time period. For example, for this purpose a mean value of the second measured value over the selected evaluation time period is used. The threshold value is set equal to the second measured value or equal to the mean value for this purpose. A rapid and efficient ascertainment of the threshold value is thus provided.

One refinement of the invention provides that the variable mean value is continuously changed. During the calibration operating mode or during the calibration time span, the combustion air ratio is periodically changed around the mean value. At the same time, the mean value is changed, specifically continuously. Preferably, the mean value is changed starting from a first value in the direction of or up to a second value. The first value corresponds here, for example, to a combustion air ratio of one or of less than one. The second value, in contrast, corresponds to a combustion air ratio of greater than one. In this way, the threshold value can be ascertained according to the described conditions particularly rapidly and effectively. The mean value is preferably changed during the calibration operating mode or during the calibration time span by a combustion air ratio difference of at least 0.01, at least 0.02, or at least 0.025.

One refinement of the invention provides that the amplitude and/or the frequency is/are selected to be constant. The amplitude or the frequency thus remains equal during the calibration operating mode or over the calibration time span. A particularly accurate ascertainment of the threshold value is implemented in this way.

The invention furthermore relates to a drive device, in particular for carrying out the method according to the statements in the scope of this description, having a drive unit producing exhaust gas and an exhaust gas posttreatment device designed as a vehicle catalytic converter for the posttreatment of the exhaust gas, wherein the drive device is provided and designed for the purpose of measuring a first measured value describing the residual oxygen content in the exhaust gas by means of a first lambda sensor arranged upstream of the exhaust gas posttreatment device and measuring a second measured value describing the residual oxygen content in the exhaust gas by means of a second lambda sensor arranged downstream of the exhaust gas posttreatment device, wherein the combustion air ratio of a fuel-air mixture used to operate the drive unit during an at least temporarily performed normal operating mode is set on the basis of the first measured value, the second measured value, and the threshold value for the second measured value.

In this case, the drive device is furthermore provided and designed to ascertain the threshold value in that during an at least temporarily performed calibration operating mode, the combustion air ratio is changed over time periodically at a determined amplitude and a determined frequency around a variable mean value and the threshold value is ascertained from the second measured value when a variation of the second measured value over time caused by the change of the combustion air ratio falls below a variation threshold value.

The advantages of such a procedure or such an embodiment of the drive device have already been indicated. Both the drive device and also the method for its operation can be refined according to the statements in the scope of this description, so that reference is insofar made thereto The features and combinations of features described in the description, in particular the features and combinations of features described in the following description of the figures and/or shown in the figures are usable not only in the respective specified combination, but also in other combinations or alone, without leaving the scope of the invention. Embodiments are thus also to be considered as comprised by the invention which are not explicitly shown or explained in the description and/or the figures, but arise from the explained embodiments or are derivable therefrom.

BRIEF DESCRIPTION OF THE FIGURES

The invention is explained in more detail hereinafter on the basis of the exemplary embodiments illustrated in the drawings, without this restricting the invention. In the figures.

DETAILED DESCRIPTION

Figure 1:
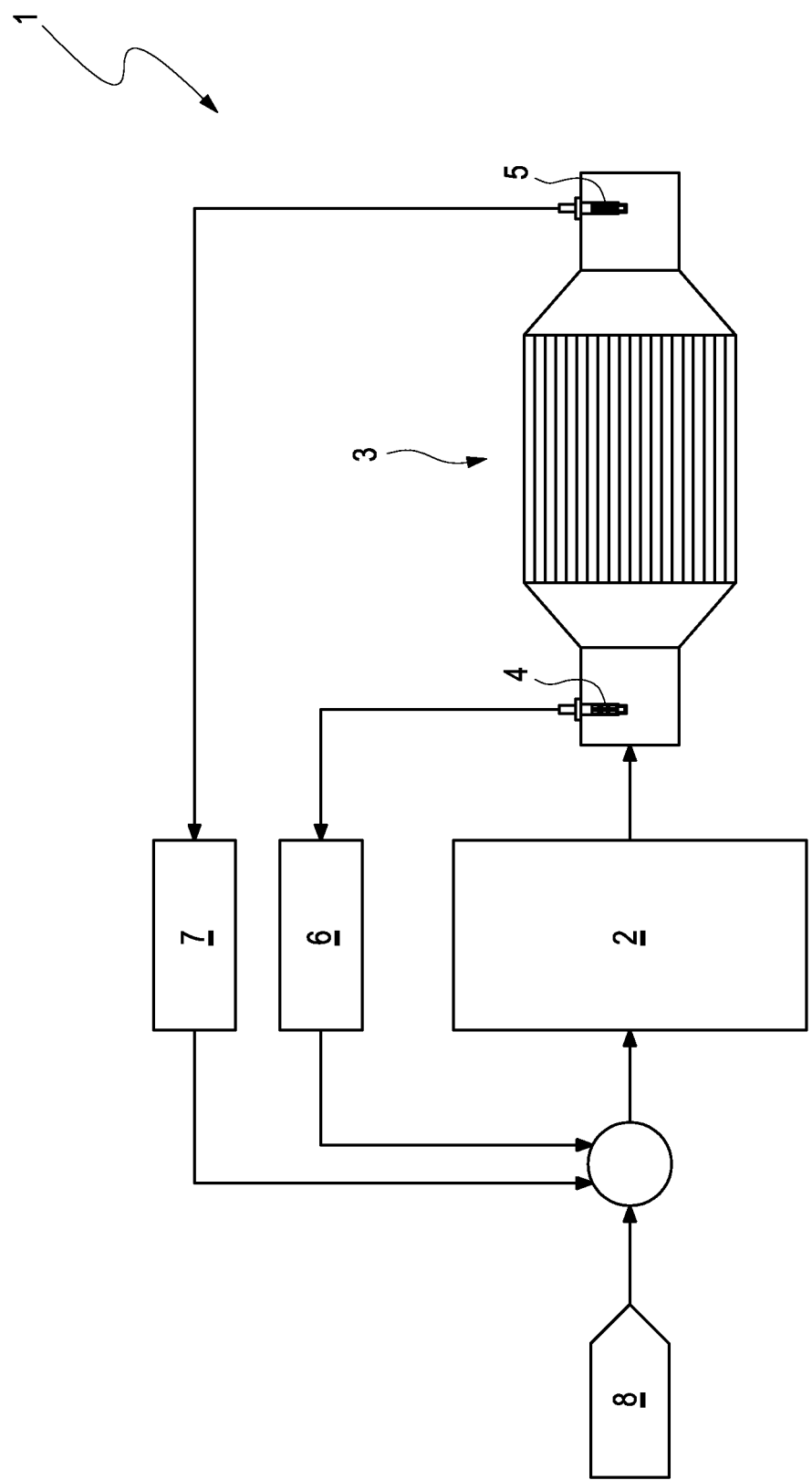
FIG. 1 shows a schematic illustration of a drive device for a motor vehicle.

FIG. 1 shows a schematic illustration of a drive device 1 for a motor vehicle (not shown in greater detail). The drive device 1 comprises a drive unit 2, by means of which a drive torque of the drive device 1 can be generated or provided. The drive unit 2 is preferably provided in the form of an internal combustion engine, in particular a gasoline internal combustion engine or a diesel internal combustion engine. The drive unit 2 is operated using a fuel-air mixture, which is composed while maintaining a determined combustion air ratio.

Exhaust gas arises during the operation of the drive unit 2, which is completely supplied to an exhaust gas posttreatment device 3 that is provided in the form of a vehicle catalytic converter. The exhaust gas produced by the drive unit 2 is supplied via the exhaust gas posttreatment device 3 to an external environment of the drive device 1. Upstream of the exhaust gas posttreatment device 3, thus fluidically between the drive unit 2 and the exhaust gas posttreatment device 3, a first measured value 6 describing the residual oxygen content of the exhaust gas at this point is measured by means of a first lambda sensor 4. Downstream of the exhaust gas posttreatment device 3, thus on the side of the exhaust gas posttreatment device 3 facing away from the drive unit 2, a second measured value 7 is measured by means of a second lambda sensor 5, which describes the residual oxygen content of the exhaust gas at this point.

The first lambda sensor 4 is preferably designed as a broadband lambda sensor, whereas the second lambda sensor 5 is provided as a binary lambda sensor. The combustion air ratio of the fuel-air mixture is set with the aid of the first lambda sensor 4 and the second lambda sensor 5. A specified value 8 is used here, which is defined, for example, by a control unit of the drive device 1. The specified value 8 is preferably one or at least approximately one.

Figure 2:
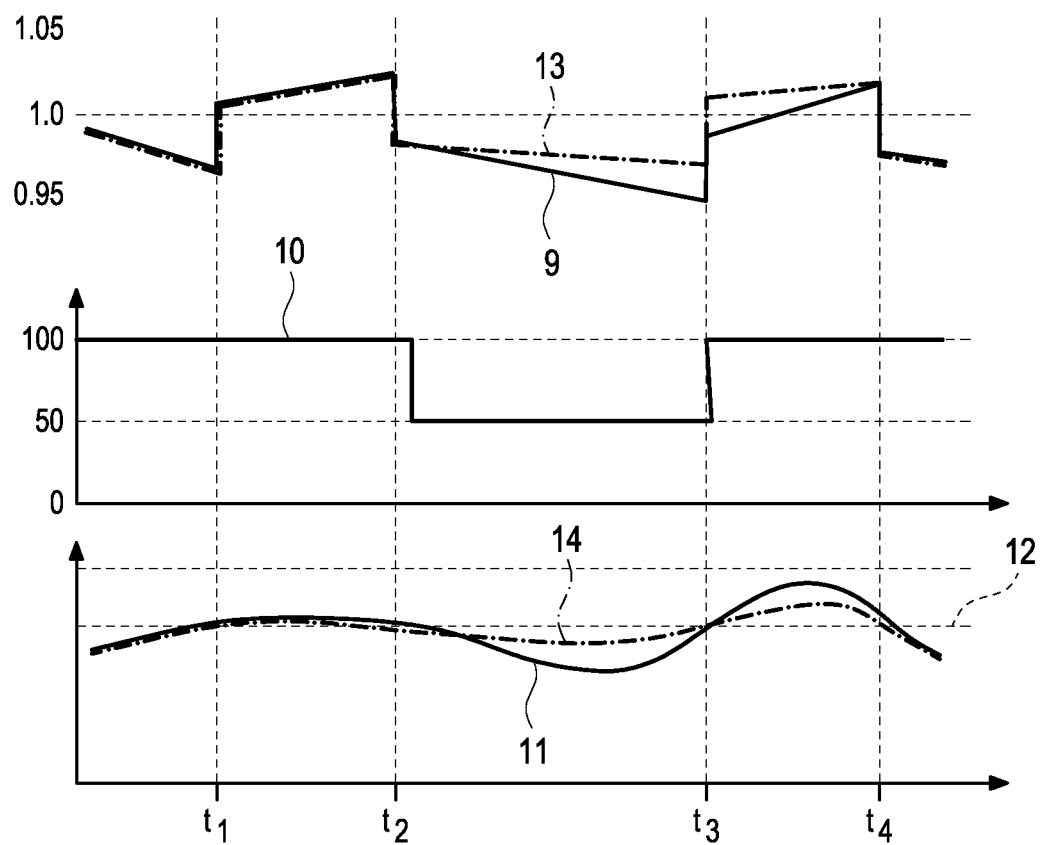
FIG. 2 shows multiple diagrams, in which curves of a target value for a lambda regulation and a measured value of a lambda sensor are plotted.

FIG. 2 shows two diagrams, wherein in an upper one of the diagrams, a curve 9 of a target value for a lambda regulation or of the first measured value 6 of the first lambda sensor 4 is shown. In a lower of the diagrams, a curve 10 indicates the curve of the second measured value 7 of the second lambda sensor 5. Both curves 9 and 10 are plotted over time. The diagrams comprise a time period, during which a calibration operating mode of the drive device 1 or of the drive unit 2 is carried out. During this, a threshold value for the second measured value 7 is to be ascertained, which is used during a normal operating mode for the lambda regulation or trim regulation of the drive unit 2.

To ascertain the threshold value, during the calibration operating mode, the combustion air ratio is periodically changed over time at a determined amplitude and a determined frequency according to the curve 9. The amplitude and the frequencies are preferably constant here over the calibration operating mode or the calibration time span. However, a variable mean value changes, around which the change of the combustion air ratio takes place. It is shown here that the mean value changes starting from a first value up to a second value, wherein the first value corresponds to a combustion air ratio of one and the second value corresponds to a combustion air ratio of greater than one.

During the change of the combustion air ratio, the second measured value 7 is measured and established with the aid of the second lambda probe 5. The curve 10 results therefrom. Subsequently, the calibration time span, during which the change of the combustion air ratio and the detection of the second measured value 7 take place, is divided into multiple evaluation time periods. Each of these have a length of 10 seconds in the exemplary embodiment illustrated here, solely by way of example. The first of the evaluation time periods thus extends from 10 s≤t<20 s, a second of the evaluation time periods from 20 s≤t<30 s, and so on.

Subsequently, the respective variation of the second measured value is ascertained for each of the evaluation time periods, namely in particular by high-pass filtering of the second measured value and calculating the difference between a maximum value of the second measured value 7 and a minimum value of the second measured value 7, each within the corresponding evaluation time period. Subsequently, that evaluation time period for which the smallest variation is present is selected from the evaluation time periods. The threshold value is ascertained from the second measured value present within this evaluation time period or a mean value of the second measured value over the evaluation time period. The threshold value is preferably set equal from the second measured value present within the selected evaluation time period or is set equal to the mean value of the second measured value 7 over the evaluation time period.

The described procedure enables a very accurate determination of the threshold value, which subsequently enables a stable and low-pollutant operation of the drive device 1. The threshold value is selected here in such a way that viewed on average over time, the combustion air ratio of the fuel-air mixture is slightly in the rich range, thus is less than one, during the normal operation. In the exemplary embodiment illustrated here, a threshold value of approximately 750 mV results.

LIST OF REFERENCE NUMERALS 1 drive device
2 drive unit 3 exhaust gas posttreatment device
4 first lambda sensor
5 second lambda sensor
6 first measured value
7 second measured value
8 specified value
9 curve
10 curve

The invention claimed is:

1. A drive device, comprising: a drive unit producing exhaust gas and an exhaust gas posttreatment device designed as a vehicle catalytic converter for posttreatment of the exhaust gas, wherein the drive device is provided and designed to measure a first measured value describing the residual oxygen content in the exhaust gas by a first lambda sensor arranged upstream of the exhaust gas posttreatment device and to measure a second measured value describing the residual oxygen content in the exhaust gas by a second lambda sensor arranged downstream of the exhaust gas posttreatment device, wherein the combustion air ratio of a fuel-air mixture used to operate the drive unit is set during an at least temporarily performed normal operating mode on the basis of the first measured value, the second measured value, and the threshold value for the second measured value, wherein the drive device is furthermore provided and designed to ascertain the threshold value in that during an at least temporarily performed calibration operating mode, the combustion air ratio is periodically changed over time around a variable mean value at a determined amplitude and a determined frequency and the threshold value is ascertained from the second measured value when a variation of the second measured value over time caused by the change of the combustion air ratio falls below a variation threshold value.

2. A method for operating a drive device having a drive unit producing exhaust gas and an exhaust gas posttreatment device designed as a vehicle catalytic converter for posttreatment of the exhaust gas, comprising: measuring a first measured value describing the residual oxygen content in the exhaust gas by a first lambda sensor arranged upstream of the exhaust gas posttreatment device and measuring a second measured value describing the residual oxygen content in the exhaust gas by a second lambda sensor arranged downstream of the exhaust gas posttreatment device, wherein the combustion air ratio of a fuel-air mixture used to operate the drive unit is set during an at least temporarily performed normal operating mode on the basis of the first measured value, the second measured value, and a threshold value for the second measured value, wherein the threshold value is ascertained in that during an at least temporarily performed calibration operating mode, the combustion air ratio is periodically changed over time around a variable mean value at a determined amplitude and a determined frequency and the threshold value is ascertained from the second measured value when a variation of the second measured value over time caused by the change of the combustion air ratio falls below a variation threshold value.

3. The method as claimed in claim 2, wherein the variation over time is ascertained by means of high-pass filtering from the second measured value.

4. The method as claimed in claim 3, wherein the high-pass filtering is carried out using a limiting frequency which is ascertained from the determined frequency.

5. The method as claimed in claim 3, wherein the combustion air ratio is changed around the variable mean value during a determined calibration time span, wherein the calibration time span is subsequently divided into multiple evaluation time periods and the respective variation of the second mean value is ascertained for each of the evaluation time periods.

6. The method as claimed in claim 3, wherein the variation is ascertained from a difference between a maximum value of the second measured value within the respective one of the evaluation time periods and a minimum value of the second measured value within the respective one of the evaluation time periods.

7. The method as claimed in claim 3, wherein that evaluation time period for which the smallest variation is ascertained is selected from the evaluation time periods.

8. The method as claimed in claim 2, wherein the high-pass filtering is carried out using a limiting frequency which is ascertained from the determined frequency.

9. The method as claimed in claim 8, wherein the combustion air ratio is changed around the variable mean value during a determined calibration time span, wherein the calibration time span is subsequently divided into multiple evaluation time periods and the respective variation of the second mean value is ascertained for each of the evaluation time periods.

10. The method as claimed in claim 8, wherein the variation is ascertained from a difference between a maximum value of the second measured value within the respective one of the evaluation time periods and a minimum value of the second measured value within the respective one of the evaluation time periods.

11. The method as claimed in claim 8, wherein that evaluation time period for which the smallest variation is ascertained is selected from the evaluation time periods.

12. The method as claimed in claim 2, wherein the combustion air ratio is changed around the variable mean value during a determined calibration time span, wherein the calibration time span is subsequently divided into multiple evaluation time periods and the respective variation of the second mean value is ascertained for each of the evaluation time periods.

13. The method as claimed in claim 12, wherein the variation is ascertained from a difference between a maximum value of the second measured value within the respective one of the evaluation time periods and a minimum value of the second measured value within the respective one of the evaluation time periods.

14. The method as claimed in claim 12, wherein that evaluation time period for which the smallest variation is ascertained is selected from the evaluation time periods.

15. The method as claimed in claim 2, wherein the variation is ascertained from a difference between a maximum value of the second measured value within the respective one of the evaluation time periods and a minimum value of the second measured value within the respective one of the evaluation time periods.

16. The method as claimed in claim 15, wherein that evaluation time period for which the smallest variation is ascertained is selected from the evaluation time periods.

17. The method as claimed in claim 2, wherein that evaluation time period for which the smallest variation is ascertained is selected from the evaluation time periods.

18. The method as claimed in claim 2, wherein the threshold value is ascertained from the second measured value in the selected evaluation time period.

19. The method as claimed in claim 2, wherein the variable mean value is continuously changed.

20. The method as claimed in claim 2, wherein the amplitude and/or the frequency are selected to be constant.

* * * * *